United States Patent [19]

Zimmet et al.

[11] 4,015,903
[45] Apr. 5, 1977

[54] MICROFILM CAMERA APPARATUS

[75] Inventors: Hans Zimmet; Manfred Wiessner, both of Dresden, Germany

[73] Assignee: VEB Pentacon Dresden, Germany

[22] Filed: Dec. 20, 1974

[21] Appl. No.: 534,771

[30] Foreign Application Priority Data

Dec. 27, 1973 Germany ............................ 175652

[52] U.S. Cl. .................................. 355/72; 355/52; 355/73; 355/75

[51] Int. Cl.² .......................................... G03B 27/58

[58] Field of Search ................... 355/72, 73, 74, 75, 355/76, 53, 52

[56] References Cited

UNITED STATES PATENTS

| 3,204,544 | 9/1965 | Shannon | 355/73 X |
|---|---|---|---|
| 3,498,711 | 3/1970 | Ables et al. | 355/75 X |
| 3,670,102 | 6/1972 | Marez | 355/73 X |
| 3,711,197 | 1/1973 | Paull | 355/72 X |
| 3,802,758 | 4/1974 | Havener et al. | 355/52 X |
| 3,837,742 | 9/1974 | Wally, Jr. | 355/75 X |
| 3,840,300 | 10/1974 | Vane | 355/53 |
| 3,856,398 | 12/1974 | Taylor | 355/52 X |

*Primary Examiner*—Edna M. O'Connor
*Attorney, Agent, or Firm*—William Anthony Drucker

[57] ABSTRACT

A microfilm camera has a carrier plate for holding a film sheet and a slidable carriage for sliding the carrier plate into and out of an operative position. The carrier plate is secured to the slidable carriage either directly or via a guide bush by means of three retaining screws which form the angles of a triangle which includes the geometric center of the carrier plate. Associated with each retaining screw is a support screw by means of which the distance between the carrier plate and the slidable carriage can be adjusted at each of the angles of the triangle. To enable the adjustment to be made by means of an auto-collimator, the carrier plate may be mirror-coated or the surface thereof which is intended to hold the film sheet.

5 Claims, 3 Drawing Figures

MICROFILM CAMERA APPARATUS

BACKGROUND TO THE INVENTION

The invention relates to a micro-film camera having a carrier plate to hold a film sheet.

In known cameras a carrier plate is mounted approximately in its geometric centre in a ball socket. Due to this arrangement whilst pivoting of the carrier plate can take place, no displacement can take place in the direction of the optical axis.

An object of the invention is to provide a carrier plate mounting wherein the carrier plate may be both pivoted and displaced in the direction of the optical axis.

SUMMARY OF THE INVENTION

According to a first feature of the invention there is provided a micro-film camera including a housing, a carrier plate within the housing having a surface for holding a film sheet, a slidable carriage associated with the carrier plate for sliding the carrier plate into and out of an operative position, and means connecting said carrier plate to said slidable carriage, said means comprising three retaining screws passing through the slidable carriage and screwed into the carrier plate, which screws form the angles of a triangle which includes the geometric centre of the carrier plate, and, associated with each retaining screw a support screw which passes through the slidable plate and abuts the carrier plate, by means of which the distance between the carrier plate and the slidable carriage can be adjusted at each of the angles of said triangle.

According to a second feature of the invention there is provided a micro-film camera including a housing, a carrier plate within the housing having a surface for holding a film sheet, a slidable carriage associated with the carrier plate for sliding the carrier plate into and out of an operative position, a guide bushing passing through said slidable carriage supporting said carrier plate for movement thereof, relative to said guide bushing, in a direction parallel with the optical axis of the camera, a flange on said guide bushing, and means connecting said flange to said slidable carriage, said means comprising three retaining screws passing through the flange and screwed into the slidable carriage, which screws form the angles of a triangle which includes the geometric centre of the carrier plate, and, associated with each retaining screw a support screw which passes through the flange and abuts the slidable plate, by means of which the distance between the carrier plate and the slidable carriage can be adjusted at each of the angles of said triangle.

The carrier plate is expediently mirror-coated on the carrier surface intended for retaining the film sheet, so that the adjustment of the plane position can be effected directly on the carrier plate, for example by an auto-collimator.

BRIEF DESCRIPTION OF THE DRAWINGS

A constructional embodiment of the invention will now be described by way of example, with reference to the accompanying drawings, in which.

DESCRIPTION OF PREFERRED EMBODIMENTS

Figure 1:
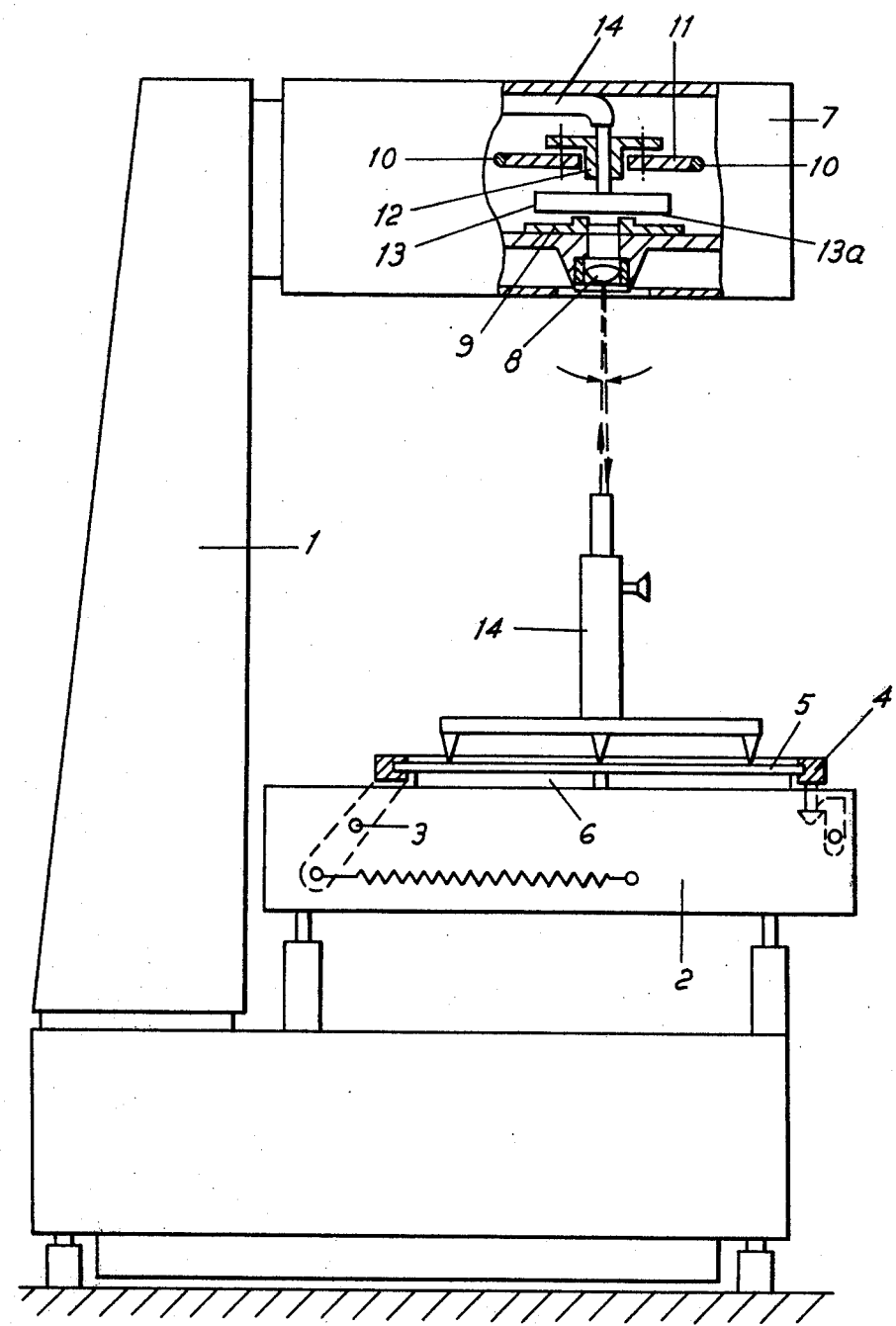
FIG. 1 shows the diagrammatic assembly of a micro-film camera.

In the lower part of a camera frame 1, a subject table 2 is arranged on which there is mounted a frame 4 pivotable about a shaft 3. A subject 6 is held in the picture-taking plane by means of a glass plate 5 arranged in the frame 4.

In the upper part of the camera frame 1 there is a camera housing 7 in which an objective lens 8 and a film trap 9 are arranged. A slide carriage 11 is movable on slide rods 10. A guide bushing 12, by which a carrier plate 13 is supported, is connected with the slide carriage 11. The carrier plate 13 is connected by a hose 14 with a vacuum pump (not shown) so that the film sheets are held on the under side of the carrier plate 13 by means of air suction.

The under surface 13a of the carrier plate 13 facing the objective lens 8 and intended to hold the film sheet is mirror-coated so that with the aid of an auto-collimator 24, which can be placed upon the glass plate 5, the parallel position of the under surface 13a in relation to the glass plate 5 and the lens 8 can be determined.

Figure 3:
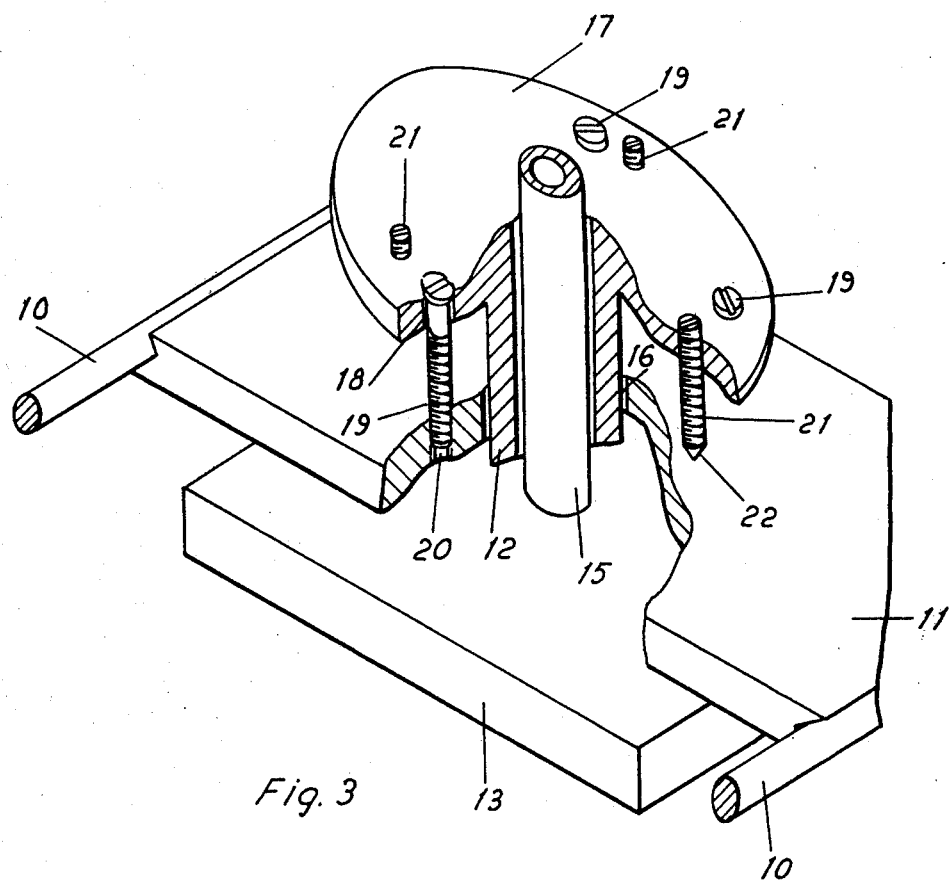
FIG. 3 shows in greater detail securing of the carrier plate in accordance with FIG. 1.

The connection between the carrier plate 13 and the slide carriage 11, as indicated in the camera housing 7 in FIG. 1, is represented in detail in FIG. 3. A support tube 15 fixed to the carrier plate 13 is held in the guide bushing 12 which extends through an opening 16 of the slide carriage 11 movable on slide rods 10 perpendicularly of the optical axis. In a flange 17 of the guide bushing 12 there are provided bores 18 for retaining screws 19 which engage in threaded holes 20 of the slide carriage 11. The retaining screws 19 constitute angles of a triangle which includes the support tube 15 secured approximately in the geometric centre of the carrier plate 13. Directly beside the retaining screws 19, support screws 21 are screwed into the flange 17 and press with their tips 22 against the slide carriage 11.

The guide bushing 12 and therefore the carrier plate 13 can be pivoted in relation to the plane of the slide carriage 11 in each case about an axis determined by the tips 22 of two support screws 21, the third pair of retaining and support screws 19 and 21 being slackened. By slackening of the support screws 21 and effecting rotation of the retaining screws 19-21 the carrier plate 13 can be displaced vertically whilst remaining parallel with the optical axis to alter the distance between flange 17 and the slide carriage 11, i.e. between carrier plate 13 and slide carriage 11. To ensure abutment of the carrier plate 13 on the film trap 9 on all sides it is expedient to mount the film trap 9 axially movably likewise at three points on compression springs.

Figure 2:
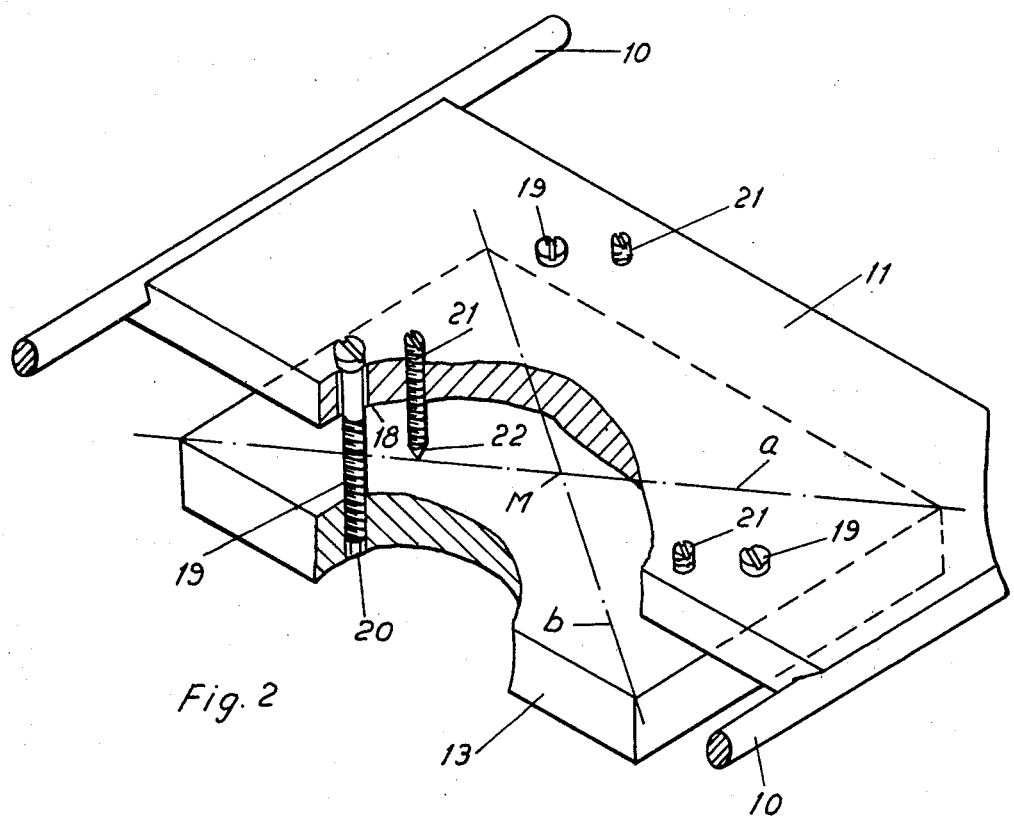
FIG. 2 shows another embodiment of the securing of the carrier plate to the slide carriage in accordance with the invention.

In the case of the embodiment according to FIG. 2, the carrier plate 13 is secured directly on the slide carriage 11. Therefore, bores 18 are provided in the slide carriage 11 for retaining screws 19 which engage in threaded holes 20 of the carrier plate 13. The retaining screws 19 again represent the angles of a triangle which includes the geometric centre M or the point of intersection of the diagonals a and b. Directly beside the retaining screws 19 support screws 21, the tips 22 of which press against the carrier plate 13, are screwed into the slide carriage 11. The carrier plate 13 can be pivoted in relation to the slide carriage 11 by slackening of one retaining and support screw 19 and 21 and can be shifted parallel with the optical axis by slackening of all or support screws 21 and rotating the retaining screws 19 to alter the distance between the carrier plate 13 and slide carriage 11.

We claim:
1. A micro-film camera including:
 a. a housing,
 b. a table for receiving a subject to be photographed at the base of the housing,
 c. an objective lens supported in a fixed position above the table,
 d. a carrier plate supported by the housing above said objective lens having a surface for holding a film sheet between the objective lens and said surface,
 e. a carriage slidable in relation to the objective lens associated with the carrier plate for sliding the carrier plate into and out of an operative position, and
 f. means connecting said carrier plate to said slidable carriage, said means comprising three retaining screws, passing through the slidable carriage and screwed into the carrier plate, which screws form the angles of a triangle which includes the geometric centre of the carrier plate, and, associated with each retaining screw, a support screw which passes through the slidable carriage and abuts the carrier plate, by means of which the distance between the carrier plate and the slidable carriage can be adjusted at each of the angles of said triangle.

2. A micro-film camera according to claim 1, wherein said carrier plate surface is mirror-coated.

3. A micro-film camera including:
 a. a housing,
 b. a table for receiving a subject to be photographed at the base of the housing,
 c. an objective lens supported in a fixed position above the table,
 d. a carrier plate supported by the housing above the objective lens and having a surface for holding a film sheet,
 e. a carriage slidable in relation to the objective lens associated with the carrier plate for sliding the carrier plate into and out of an operative position,
 f. a guide bushing passing through said slidable carriage supporting said carrier plate for movement thereof, relative to said slidable carriage, in a direction parallel with the optical axis of the camera,
 g. a flange on said guide bushing, and
 h. means connecting said flange to said slidable carriage, said means comprising three retaining screws passing through the flange and screwed into the slidable carriage, which screws form the angles of a triangle which includes the geometric centre of the carrier plate, and, associated with each retaining screw a support screw which passes through the flange and abuts the slidable carriage, by means of which the distance between the carrier plate and the slidable carriage can be adjusted at each of the angles of said triangle.

4. A micro-film camera according to claim 3, wherein the carrier plate is supported on a tube which is held in said bushing, said carrier plate being provided with at least one aperture on its under surface communicating with said tube, and means being provided to apply a vacuum to said tube whereby the film sheet is held to the surface of the carrier plate.

5. A micro-film camera according to claim 3, wherein said carrier plate surface is mirror-coated.

* * * * *